United States Patent [19]

Dreiding

[11] 4,030,209
[45] June 21, 1977

[54] MOLECULAR MODELS

[76] Inventor: André Dreiding, Langackerstrasse 43, Herrliberg, Switzerland

[22] Filed: Mar. 3, 1975

[21] Appl. No.: 555,044

[30] Foreign Application Priority Data

Mar. 7, 1974 Switzerland .................. 3201/74

[52] U.S. Cl. .................. 35/18 A; 46/29; 46/242; 403/166

[51] Int. Cl.² .................. G09B 23/26

[58] Field of Search .......... 35/18 A, 34, 77; 46/23, 46/25, 27, 28, 29; 285/65, 67; 339/47 R, 47 C, 48; 403/146, 166

[56] References Cited

UNITED STATES PATENTS

| | | | |
|---|---|---|---|
| 1,190,502 | 7/1916 | Anderson | 403/146 |
| 1,851,159 | 3/1932 | Dodge | 35/18 A |
| 2,970,388 | 2/1961 | Yonkers | 35/18 A |
| 3,230,643 | 1/1966 | Mathus | 35/18 A |
| 3,373,397 | 3/1968 | Renshaw | 285/65 X |
| 3,492,756 | 2/1970 | Stubbmann | 35/77 UX |
| 3,509,642 | 5/1970 | Brumlik | 35/18 A |

FOREIGN PATENTS OR APPLICATIONS

| | | | |
|---|---|---|---|
| 26,188 | 11/1953 | Finland | 35/18 A |
| 1,533,186 | 6/1968 | France | 339/47 R |
| 942,506 | 11/1963 | United Kingdom | 339/47 R |
| 1,322,186 | 7/1973 | United Kingdom | 403/146 |

*Primary Examiner*—Harland S. Skogquist
*Attorney, Agent, or Firm*—Woodhams, Blanchard and Flynn

[57] ABSTRACT

A molecular model has a center made up from two relatively pivotal parts which are angularly movable between predetermined angular positions. The parts are relatively unstable when not in such angular positions. Atomic valency bonds in the form of elongate flexible members extend from the pivotal parts and have at their free ends couplings which engage another like coupling of another flexible member or another center part. The couplings are identical and each comprises both a projection and a socket or in one embodiment a magnet presenting at an end surface, both a North and a South pole.

29 Claims, 29 Drawing Figures

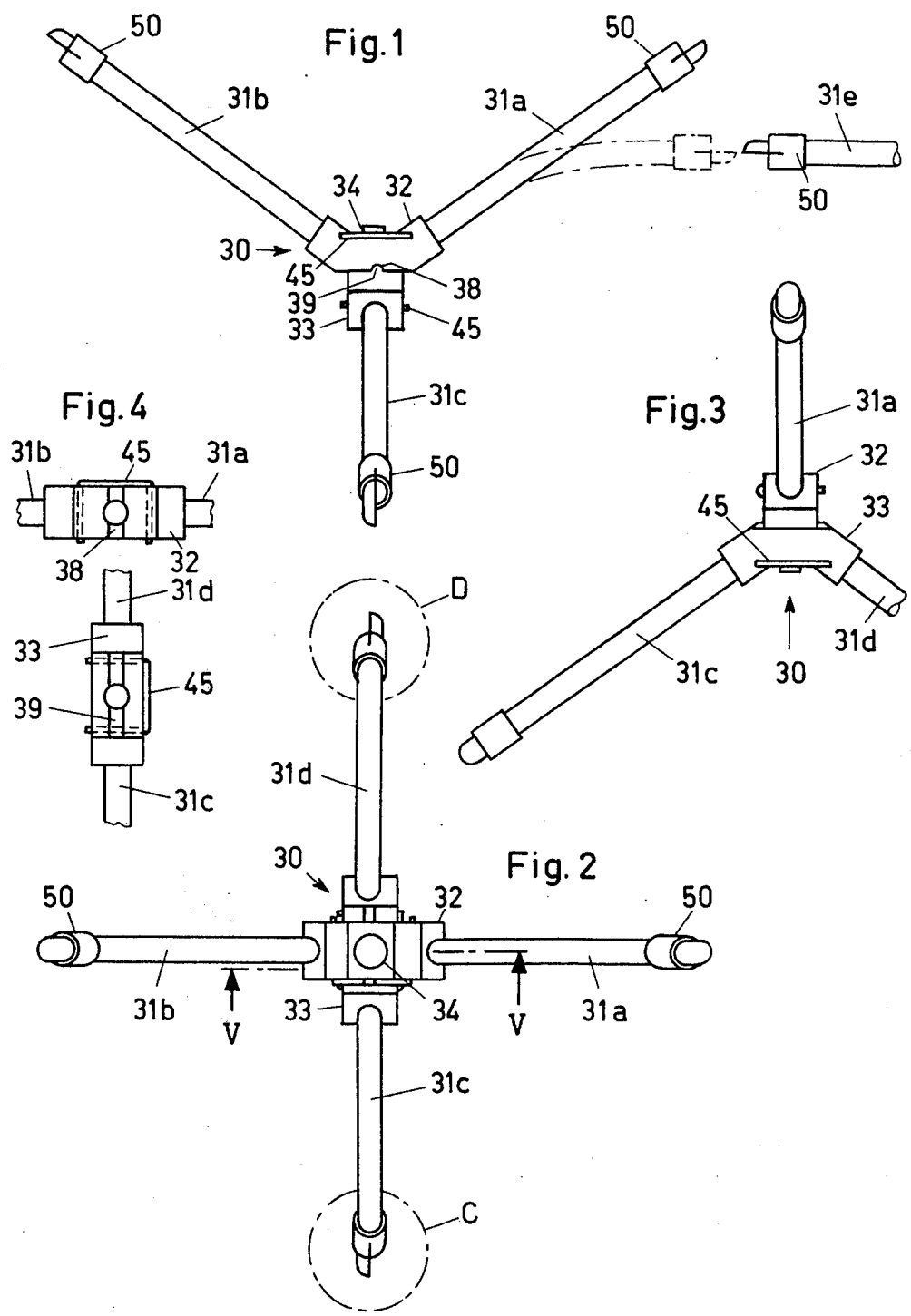

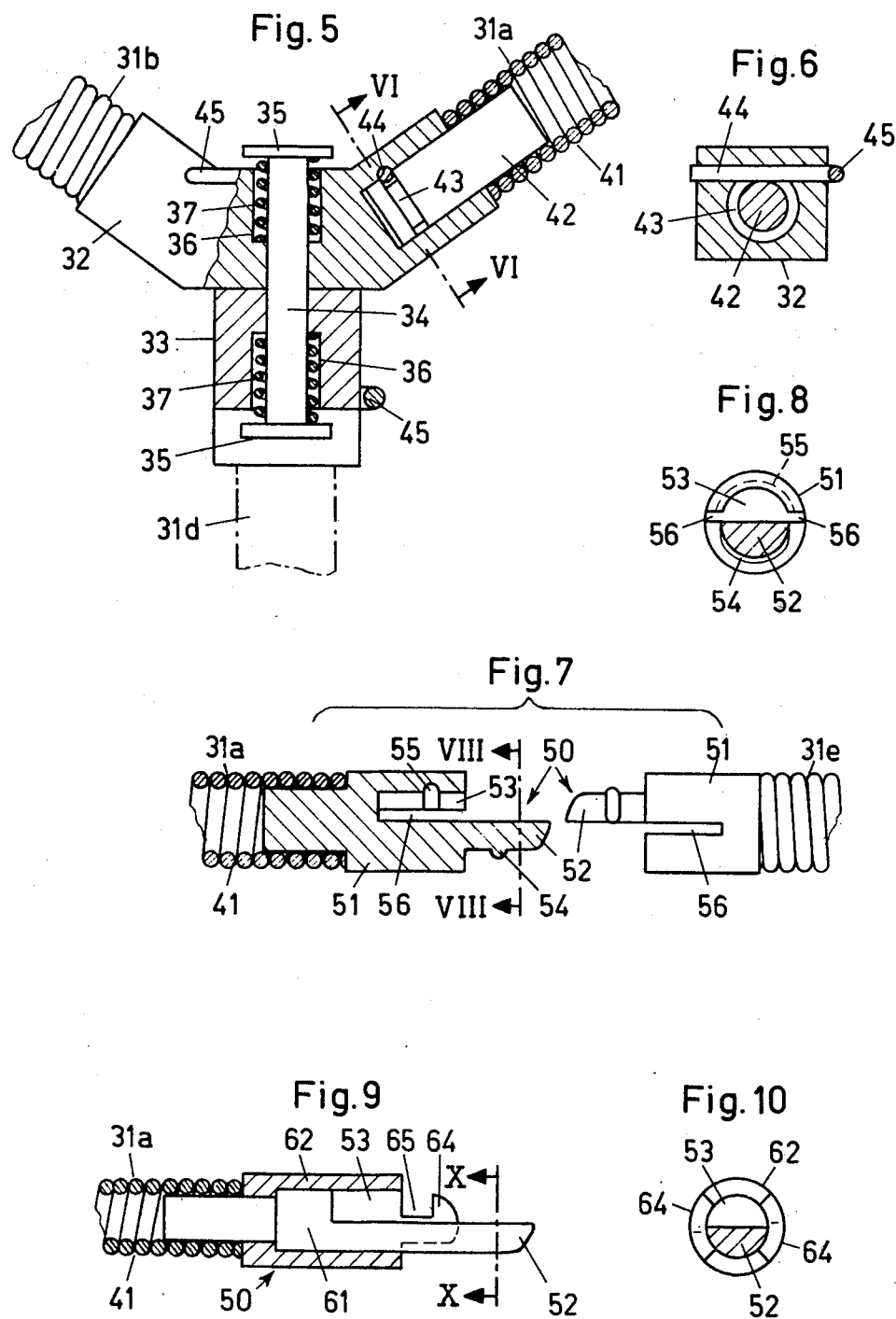

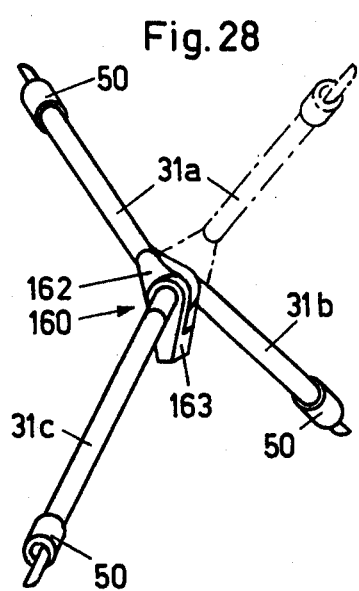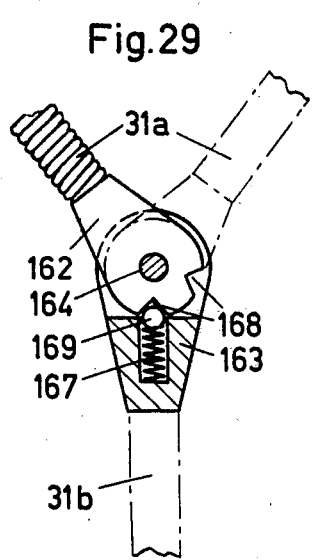

MOLECULAR MODELS

BACKGROUND OF THE INVENTION

1. Field of the Invention

The invention relates to structural elements for forming stereochemical models of molecular bonds between multivalent atoms in atomic unions, molecules, molecular aggregates or chemical compounds, the said structural elements each having at least two connector arms representing the valences of at least one atom, each of the connector arms being at one end connected to at least one other of the connector arms, and at least some of the connector arms having in each case a free end which, in order to represent a bond, can be equiaxially coupled with the free end of another of the connector arms of the same structural element or another of the structural elements, manual coupling and uncoupling being possible, and at least one of the said connector arms being connected or able to be coupled to others by an articulating mechanism in such a way as to permit angular adjustment of at least one said connector arm with respect to other connector arms.

2. Description of the Prior Art

In the case of known structural elements of the aforesaid type, the free ends of some connector arms are each shaped as a plug in pin while the free ends of some connector arms other arm are each shaped as a plug-in socket, into which the plug-in pin can be fitted. In the simplest case, some of the connector arms are constructed as rods and some as tubular portions, the rods being capable of being pushed into the tube portions until they reach an abutment or until a snap action locking device is engaged. In other known structural elements, all free ends of the connector arms are constructed as plug in pins. For the coupling of two such connector arms a separate coupling sleeve is required, the free ends of the pin-shaped connector arms to be coupled being inserted into the opposite ends of the sleeve. Further known structural elements for the construction of stereochemical models of molecules have each the shape of a body, for example of a ball, such that instead of having connector arms that can be joined together pairwise, there are holes in these bodies, functioning as plug-in sockets. In this case it is necessary to make use of connecting rods, the opposite ends of which are designed as plug-in pins intended to be inserted into holes of the bodies. Where the known structural elements are concerned, the plug-in pin and plug-in socket or plug-in pins and coupling sleeves or holes and coupling sleeves are all of circular cross-section. Consequently, the structural elements coupled together are capable of rotation about the common axis of the coupling with respect to each other, the resistance to such rotation either being total so that only one position is given or being constant due to even friction, the friction being required to hold the elements together. By reason of the aforesaid rotatability or evenly resisted rotatability, the models of atom bonds or molecules formed from inter-engaged structural elements is either not movable at all of so movable that any connector arms of different structural elements which are not coupled directly to one another may vary their angular orientation on position in space with respect to one another only in an uncontrolled manner.

Also known are structural elements in which at least two connector arms emanating from an atom representing center are mode angularly movable by means of an articulation mechanism, said mechanism however permitting an unlimited number of different angular positions.

The capacity for movement mentioned is actually found in the world of actual chemical compounds and molecular aggregates, but the rotatability of the bonds between pairs of atoms is subject to certain uneven limitations. Definite angular positions tend to occur while other angular positions are only passed through during interconversion of the occurring ones, depending on the three-dimensional configuration of the ligands of the bonded atoms.

To a man skilled in the art of stereochemistry, it is known that two atoms bound together and having each at least one ligand situated at an angle with respect to the bond connecting said two atoms can be rotated with respect to each other about their interconnecting axis and that certain stable angular positions occur, while other are unstable and are only passed through during the said rotation. This partially hindered rotation is called "conformational change".

Also known to a man skilled in the art, is that when there are three or more ligands grouped around a central atom, the ligands may assume certain defined different spatial arrangements, but interconversion between these defined arrangements is possible. The partially hindered interconversion between these defined arrangements of ligands about the central atom is called as "ligand reorganisation" or "pseudo-rotation." Where two mirror-image arrangements are possible, one speaks of an "inversion."

When it is desired to model chemical reactions between molecules or chemical transformations within a molecule, then connector arms of the structural elements of the model representing atomic bonds have to be coupled or separated from to one another in pairs, whereby in many cases one or more of positions abovementioned angular movements are required at the same time and where it is essential that not all angular positions can be reached with equal probability, since the operation of changing one preferred angular position to another must be performed intentionally, the number of times this is done having to be counted. This is the case, for example, with the model representation of so-called "valence tautomeric" or "pericyclic" reactions, which - particularly in carbon systems - occur stereo-specifically according to the rules of "parity" or "orbital symmetry" known to a man skilled in this field. In these cases, if the sum of the number of times connectors have to be uncoupled (for subsequently being recoupled in different combinations) and of the number of times such angular position changes, for instance inversions, have to be executed is an odd number, it may be concluded that the modelled reaction actually occurs, whereas if this sum is even the modelled reaction does not occur. With the hitherto-known structural elements for forming stereochemical models, the model representation of the said reactions frequently left much to be desired, because the available articulating mechanisms permitted too many angular positions. so that operations of changing the preferred positions cannot be counted. For this reason, it has been difficult hitherto to forecast the structural configuration of products unknown prior thereto.

SUMMARY OF THE INVENTION

It is the object of the present invention to provide a set of structural elements of the type mentioned at the outset, which does not have the aforesaid disadvantages and which permits the formation of stereochemical models of molecular bonds between multi-valent atoms in compounds in a manner so that preferred arrangements exist and that means are provided for interconverting these preferred arrangements without disconnecting the structural elements. In the case of a set of structural elements having connector arms of which at least one is on can be connected with others in a manner permitting angular movement by means of an articulating mechanism, this problem is resolved according to the invention as follows associated with the articulating mechanism there are mechanical means which cause discontinuous, manually surmountable resistance against angular movement so that at least two definite stable rest positions are provided, an unintentional departure from which is prevented. This construction makes it possible to adapt the mobility of the model structure largely to the actual behaviour of the molecules represented by the model.

The articulating mechanism preferably has two parts pivotable with respect to each other and each attached to at least one of the connector arms, at least one of the pivot parts having at least one ratchet recess while at least the other hinge part has at least one ratchet element such as a protrusion on tongue for resilient engagement into the recess in the first rivet part.

It is also possible for each of the pivot parts to have both at least one recess and at least one ratchet element for resilient engagement of each of the ratchet elements into each recess, whereby the two pivot parts may advantageously be constructed identical to each other.

One advantageous embodiment provides for the two pivot parts to be resiliently biased against each other under the influence of at least one spring element acting in the direction of the axis of articulation and for the spring element at the same time to bring about resilient engagement of the ratchet element into the recess. The recess and the ratchet element may thereby be constructed directly on the facing surfaces of the pivot parts.

The longitudinal direction of at least one of the connector arms connected to the articulating mechanism may diverge from the direction of the axis of articulation. It is however also possible for the articulating mechanism to be so disposed that the longitudinal direction of at least one of the connector arms connected to the articulating mechanism to extend coaxially with the axis of articulation. In the latter case, it is expedient for one of the pivot parts to be constructed as a sleeve while the other pivot part is constructed as a pivot pin engaged into the sleeve, the pivot pin having at least one portion serving as a recess by being of a cross-section which diverges from the circular shape, the sleeve comprising at least one ratchet element which engages the aforementioned recess portion of the pivot pin. The ratchet element may simply be an inwardly deformed part of the sleeve or may be constituted by a spring tongue fixed on or integral with the sleeve.

The pivot parts may be constructed as devices which in addition to articulation permit the separation and coupling of at least two of the connector arms.

Expediently, at least some of the connector arms consist in the main of a flexible spring element which, in the unloaded condition, always assumes a rectilinear course. The spring element may for example be a coil spring having coils bearing closely one on another.

In the assembly of stereochemical models from one or more structural elements, free ends of connector arms of these structural elements must be coupled to each other in pairs and in the same axis. In the case of the model representation of chemical transformations or reactions, one or more of the already connected arm pairs will often have to be disconnected and subsequently, possibly after at least one of the above-mentioned articulating movements, one or more connector arm pairs have to be reconnected in different combinations. In order to permit reconnection of the connector arms in any combination, it is envisaged in a further development of the invention that all free ends of the connector arms of all structural elements should be provided with identically constructed coupling devices which can each be coupled to a likewise identically constructed coupling device on any other of the connector arms. The mutual compatibility of all coupling devices is particularly important for example when "pericyclic" reactions, where the number of bond changes and inversions must be counted.

In the case of one advantageous embodiment, each of the mutually identical coupling devices has both a projecting coupling part, e.g. a plug pin, and a coupling recess, e.g. a plug socket, the construction and disposition being such that when any two of the connector arms are coupled, the projecting coupling parts of these two connectors can simultaneously be brought into coupling engagement with the coupling recesses of just these two connector arms.

In addition, it is advantageous for the coupling device of each connector arm to have means for the positive or operative securing (by locking through their shape or by pressure locking) of the connection between the coupling devices of any two connector arms.

Another advantageous embodiment provides for each coupling device to have at least one permanent magnet with the north and south pole faces located at the free end of the coupling device so that when any two of the connector arms are coupled the north pole faces of the magnets of these connector arms can simultaneously be brought into contact with the south pole faces of the magnets of these two connector arms.

BRIEF DESCRIPTION OF THE DRAWINGS

FIG. 1 shows a first embodiment of a structural element having two pairs of connector arms rotatable with respect to each other, and also a part of a connector arm of a further structural element;

FIG. 2 is a plan view of FIG. 1;

FIG. 3 is a side view from the right in FIG. 1;

FIG. 4 represents parts of the structural element shown in FIGS. 1 to 3, in the dismantled condition;

FIG. 5 shows on an enlarged scale a partial section on the line V—V in FIG. 2, through the middle part of the structural element;

FIG. 6 is a cross-section on the line VI—VI in FIG. 5;

FIG. 7 shows two free end parts of connector arms of the structural element according to FIG. 1 which are capable of being coupled to each other in the same axis, the illustration being on an enlarged scale, the coupling device of one connector arm being shown in longitudinal section while that of the other connector arm is illustrated in elevation;

FIG. 8 is a cross-section on the line VIII—VIII in FIG. 7;

FIG. 9 shows an alternative embodiment of coupling device at the free end of a connector arm, in longitudinal section;

FIG. 10 is a cross-section on the line X—X in FIG. 9;

FIG. 28 shows a further embodiment of a structural element having three connector arms in a perspective view; and FIG. 29 shows the central part of the structural element according to FIG. 28 on an enlarged scale and in section.

DESCRIPTION OF THE PREFERRED EMBODIMENTS

Figure 11:
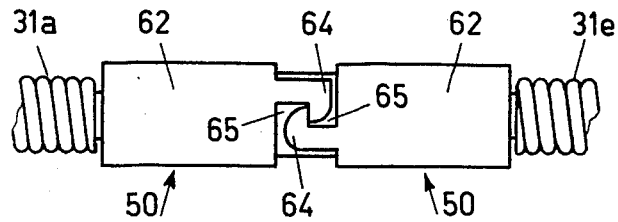
FIG. 11 shows, in the coupled condition, two connector arms provided with coupling devices according to FIGS. 9 and 10.

According to FIGS. 1 to 3, a structural element 30 for forming stereochemical molecular models has altogether four connector arms 31a, 31b, 31c and 31d which radiate out from a middle part 32, 33 of the structural element. The middle part 32, 33 represents an atom with four valencies, which are in turn represented by the connector arms 31a to 31d. The free ends of the connector arms are disposed at the corners of an imaginary regular tetrahedron. The structural element 30 is accordingly a model of a carbon atom and its four valency bonds.

The central part 32, 33 consists of two substantially identical pivot parts 32 and 33 which are connected to each other by a stub axle 34 in such a way that they can be located with respect to each other. The axle stub 34 passes through bores in the two pivot parts 32 and 33, as can be seen particularly in FIG. 5, and has at its ends flanges 35. Each flange 35 constitutes a stop for one end of a coil thrust spring 36 which encloses the stub axle 34 and which is accommodated in a recess 37 in the relevant pivot part 32, 33. Two such coil thrust springs 37 are provided and one end of each spring is pressed against the relevant flange 35 of the stub axle 34 which its other end is pressed against the bottom of the recess 36. Under the influence of the spring 37, the two pivot parts 32 and 33 are biased resiliently against each other. One end part 32 is, on its face which is towards the other pivot part 33, provided with a groove 38 (FIGS. 1 and 4) which serves as a notch recess, which cuts the longitudinal axis of the stub axle 34. The other pivot part 33 has on its face which is towards the pivot part 32, a rib 39 which is a notch member which engages into the groove 38 when the pivot parts 32 and 33 assume definite positions of rotation with respect to each other, engagement occurring under the influence of the springs 37.

On one component part 32, the two connector arms 31a and 31b are so disposed that with respect to the axis of rotation of the pivot parts 32 and 33 they are inclined at angles of equal magnitude. The other two connector arms 31c and 31d are likewise so disposed on the other structural part 33 that with respect to the axis of rotation of the pivot parts 32 and 33 they are incline by angles of identical magnitude. In consequence, the axis of rotation of the pivot parts 32 and 33 is a line of symmetry of each pair of connector arms 31a and 31b and 31c, 31d. The groove 38 which serves as a notch recess and the rib 39 which serves as a notch member are now so disposed on the pivot parts 32 and 33 that in the engaged position of the pivot parts the longitudinal axes of the two connector arm pairs 31a, 31b and 31c, 31d extend in two planes which intersect at right-angles, as can be seen particularly in FIG. 2.

The connector arms 31a, 31b, 31c and 31d are each formed in the main by a coil spring 41 having closely adjacently disposed coils, as illustrated in FIG. 5. Therefore, the connector arms are elastically pliable and tend, in an unloaded condition, always to assume a rectilinear form. Rigidly inserted, for example by adhesion, into the end of the coil spring 41 which is connected to the relevant pivot part 32, 33 is a connecting pin 42 (FIG. 5). The end part of the connecting pin 42 which projects from the coil spring 41 is mounted rotatably in a bore in the relevant pivot part 32, 33 and has a peripheral groove 43. In order to secure the connector arm against unintended separation from the relevant hinge part 32, 33, a wire pin 44 engages tangentially into the peripheral groove 43. The wire pin 44 traverses thereby an eccentrically disposed transverse bore of the pivot part 32, 33 as can be seen most clearly from FIG. 6. All connector arms 31a to 31d are connected in the same manner to the pivot parts 32 and 33. For practical reasons, the wire pins 44 for securing the two connector arms disposed on one and the same part 32, 33 are constituted by two parallel arms of a U-shaped wire clip 45. These wire clips 45 can be clearly seen in FIGS. 1, 3 and 4. When the wire clip 45 is withdrawn, it is possible subsequently to detach the connector arms from the pivot parts 32 and 33.

Provided at the free end of each connector arm 31a, 31b, 31c, 31d is a coupling device 50 which makes it possible for the relevant connector arm to be coupled without aids and in the same axis with a matching coupling device of another connecting arm in order thus to represent a chemical bond. The said other connector arm is usually a component part of a further structural element but it may if necessary also be a connector arm of the same structural element 30. The coupling devices 50 on all free ends of all connector arms having a free end and included among the structural elements which belong to a complete set of structural elements for forming stereochemical models, are ideally all of identical construction, in fact so that it is possible without aids and manually to establish and then disconnect a coupling connection between any two free ends of the connector arm.

According to FIG. 7, each coupling device 50 has, disposed on the free end of the relevant connector arm, a coupling piece 51 which is mounted in the coil spring 26, for example by adhesion. The coupling piece 51 has both a projection plug pin 52 and also a corresponding plug socket 53. The plug pin 52 and the plug socket 53 each have a semi-circular cross-section and are furthermore so constructed and disposed that when coupling two connector arms the plug pin of the coupling device of one connector arm can be fittingly inserted into the plug socket of the coupling device on the other connector arm, and vice versa. In the coupled condition, then, the plug pins of the two coupling devices are simultaneously in coupling engagement with the plug sockets of these two coupling devices. In order to prevent unintended separation of the coupled connector arms, it is expedient to provide means for the positive securing of the coupling connection. In the case of the embodiment shown in FIG. 7 and 8, for this purpose, the plug pin 52 of each coupling device 50 has on its outer surface a projection in the form of a rib 54 extending at right-angles to the direction of insertion, while the inner walls of the plug socket 53 are provided with a corresponding groove-shaped notch 55. When coupling two connector arms together, the projection 54 on one coupling device 50 automatically engages into the notch 55 in the other coupling device and vice versa. In order that the plug socket 53 may be somewhat resilient, the coupling piece 51 may be provided with longitudinal slits 56.

On those free ends of connector arms which, when a molecular model is built up from several strutural elements, remains free, variously colored spheres C and D (FIG. 2) having a radial bore may be fitted for the modelled representation of various bonds, i.e. substituents which do not participate in the reactions and transformation which have to be depicted.

The structural element 30 described has over known types of construction the essential advantage that by rotation of one pivot part 32 with respect to the other pivot part 33 through 180°, the positions of two connector arms, e.g. 31c and 31d, can be effortlessly interchanged, while at the same time the other connector arms, e.g. 31a and 31b, retain their positions. This process is described as inversion. Such an inversion so alters these spatial configurations of the connector arms that their configuration prior to inversion and that which follows inversion, are the mirror-image of each other. Engagement of the rib 39 in the groove 38 produces two definite and preferred angular positions of the hinge parts 32 and 33 and thus of the connector arm pairs 31a, 31b and 31c, 31d. These notch positions are to a certain degree stable since a considerable resistance has to be overcome in order to disengage the rib 39 from the groove 38 by rotation of the pivot parts 32 and 33 with respect to each other. On the other hand, when the rib 39 and the groove 38 are once disengaged, a rotation of the pivot parts 32 and 33 is relatively easy. All other rotary positions apart from the two notched positions are therefore unstable. Once the resistance to rotation from a notched position has been overcome, the pivot parts 32 and 33 fall almost by themselves into the opposite notched position. This behaviour of the structural element 30 corresponds to the actual behaviour of a carbon atom in a chemical compound.

A further advantage of the structural element 30 described lies in that the identically constructed coupling devices 50 make it possible for each free end of the connector arm 31a to 31d to be connected with any desired other free end of a connector arm of a further such or other structural element in the same axis and without aids. This is particularly important in connection with inversions of the connector arms, because then in each case two of the connector arms interchange their positions. If different coupling devices were present in pairs, then after an inversion or after any other reducing of the pairwise connected arms (corresponding to chemical transformations of the atomic bond), the desired new coupling connections could in many cases no longer be readily contrived.

By reason of the combined action of the rotatability with predetermined notch positions on the one hand and the optional coupling facility of the free ends of the connector arms with all the structural elements which belong to a set, on the other, it is possible, using structural elements of the described type, to build up molecular bonds in compounds and particularly to show the course of chemical reactions and transformations in a far more true-to-reality, convenient, rapid and easily visible fashion, in model form, than was hitherto possible. Also the forecasting of new reactions and products is substantially facilitated thereby. The desired structural elements 30 are suitable particularly for the modelled depiction of so-called "valence-tautomeric" or "pericyclic" reactions in the carbon systems, which reactions occur stereospecifically according to the rules of "parity" or of "orbital symmetry" which are well-known to a man skilled in the art.

FIGS. 9, 10 and 11 show an alternative embodiment of the coupling devices 50. On the end of the coil spring 26 representing the connector arm, e.g. 31a, there is attached, for example by adhesion, a coupling piece 61 which is enclosed by a rotatable sleeve 62. A plug pin 54 is constructed on the coupling piece 61, while a plug socket 53 is defined partially by the coupling piece 61 and partially by the sleeve 62. On the outer free end of the sleeve 62 there are two hook-like projections 64 which extend firstly in the longitudinal direction of the sleeve 62 and then in the peripheral direction thereof so that between their hook-like angled end part and the end of the sleeve 62 a notch 65 is formed. The two projections 64 of the sleeve 62 are disposed diametrically opposite each other. When the coupling devices of two connector arms, e.g. 31a and 31e are fitted together, each of the projections 64 on one coupling device are inserted between the projections 64 on the other coupling device, whereupon the sleeves 62 of the two coupling devices are so rotated in respect of each other that the angled-over end parts of the projections 64 of both coupling devices positively engage with the notches 65 of both coupling devices, as shown in FIG. 11. As a result, the coupling connection is effectively secured against undesired loosening.

Figure 12:
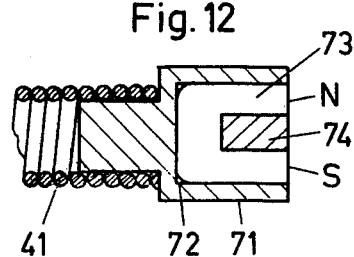
FIG. 12 shows a further alternative embodiment of coupling device at the free end of a connector arm, in longitudinal section.
Figure 13:
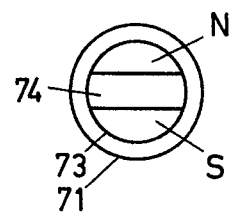
FIG. 13 is a view from the right in FIG. 12.

FIGS. 12 and 13 show another alternative embodiment of the coupling devices 50. On the free end of the coil spring 26 representing the relevant connector arm there is a coupling piece 71 with a central recess 72. An approximately U-shaped permanent magnet 73 is inserted into the recess 72 in the coupling piece 71 which consists of non-magnetic material such as for example aluminum or plastics material, and is secured against sliding out, for example by adhesion. The north and south pole faces N and S of the magnet lie on the free end of the coupling piece 71. The intermediate space between the two arms of the magnet 73 is expediently filled with a plastics material 74. When two connector arms which are each provided with the described coupling devices, are coupled together, the north pole face N of one coupling device is simply brought into contact with the south pole face of the other coupling device. By reason of the mutually attracting dissimilar magnetic poles, the coupling devices are held against each other with sufficient force to obviate unintentional separation of the coupled connector arms, even when these connector arms are bent resiliently.

It is naturally possible also to provide the coupling device according to FIGS. 12 and 13 additionally with means for the positive securing of the coupling connection against undesired separation, for example as in FIG. 9 to 11.

It should be mentioned at this point that the connector arms, instead of being formed by the coil springs 26, may also be formed by other elastically flexible spring elements which in the unloaded condition always assume a rectilinear course, consisting for example of rods or tubular portions of synthetic material.

Figure 14:
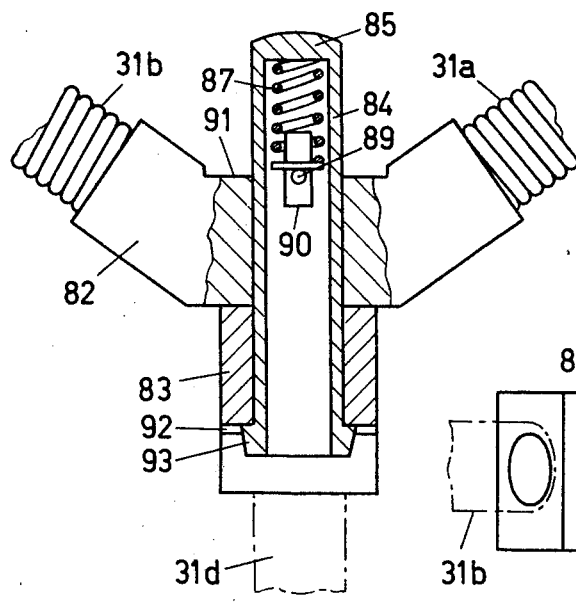
FIG. 14 is a view similar to that in FIG. 5, of a second embodiment of structural element having two pairs of connector arms which are rotatable with respect to each other.
Figure 15:
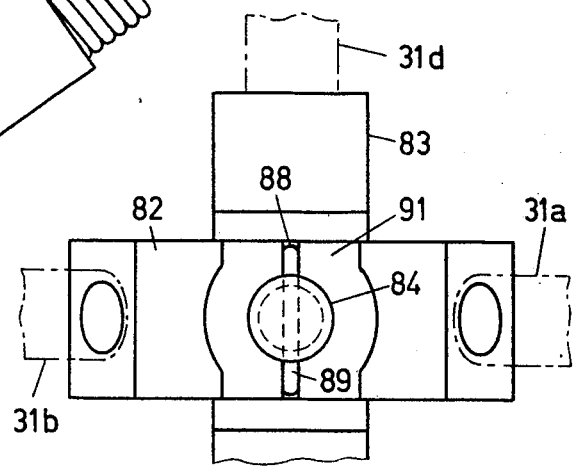
FIG. 15 is a plan view of the middle part of the structural element shown in FIG. 14.
Figure 16:
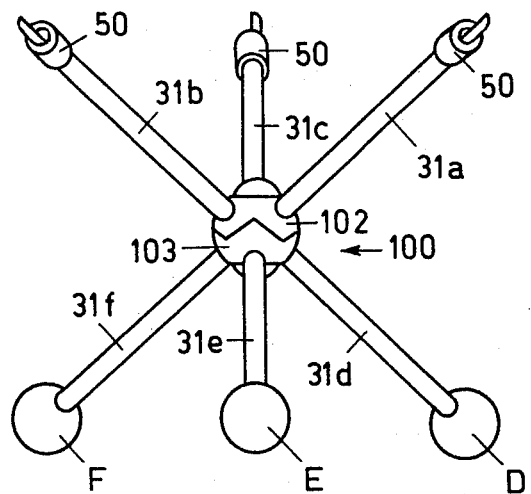
FIG. 16 illustrates a third embodiment of a structural element having groups of three connector arms rotatable with respect to each other, in plan view.
Figure 17:
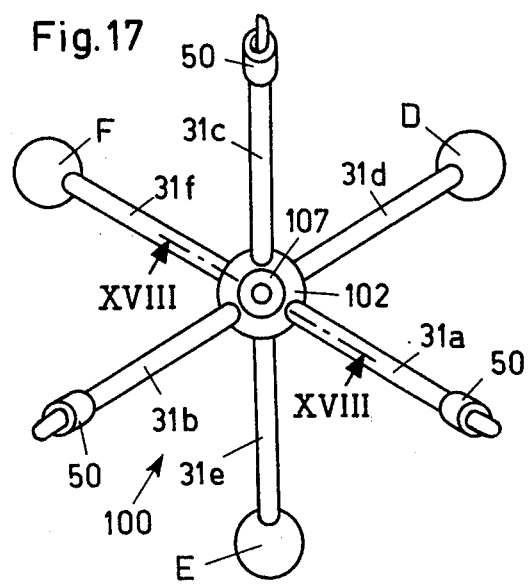
FIG. 17 is a plan view of FIG. 16.

FIGS. 14 and 15 show an alternative embodiment of central parts of the structural element 30 which is described with reference to FIG. 1 to 6. For the rotatable connection of two pivot parts 82 and 83 which are substantially the same as the pivot parts 32 and 33 in the example shown in FIGS. 1 to 6, a hollow stub axle 84 is provided which is non-rotatably fixed in a pivot part 83 and extends through the other pivot part 82. The end 85 of the stub axle 84 which projects from the pivot part 82 is closed and serves as an abutment for one end of a coil thrust spring 87 which is accommodated in the interior of the hollow stub axle 84. The other end of the spring 87 lies against a sliding piece in the form of a transverse pin 89 which passes through two oppositely disposed longitudinal slots 90 in the stub axle 84. Under the influence of the spring 87, the transverse pin 89 is biased onto that external face 91 of the pivot part 38 which is directed away from the pivot part 83, so that the two pivot parts 82 and 83 are held together. At the same time, the transverse pin 89 serves as a notch member which likewise under the influence of the spring 87 can engage into a slot-shaped notch recess 88 constructed on the said outer side 91 of the pivot part 82; FIG. 15. Engagement of the transverse pin 89 into the notch recess 88 occurs at two definite angular positions (staggered by 180° with respect to each other) of the pivot parts 82 and 83 with respect to each other, similar to the embodiment described with reference to FIGS. 1 to 6.

To simplify manufacture, the two pivot parts 82 and 83 may be constructed to be completely identical to one another. In this case, also the pivot part 83 has on its outside which is directed away from the pivot part 82 a groove 92 (FIG. 14) which corresponds to that groove 91 of the pivot part 82 which serves as a notch recess but which is not used to produce predetermined notched positions of the pivot parts. It is however possible for example to have one flange 93 of the stub axle 84 engage into the groove 92 of the pivot part 83 in order to guarantee the desired security against rotation between the stub axle and the pivot part 83.

In the case of an alterntive embodiment (not illustrated) of the form of construction shown in FIGS. 14 and 15, the coil thrust spring 87 could be disposed externally of and around the stub axle 84.

The example of embodiment of a structural element 100 shown in FIGS. 16 to 19 and intended for forming stereochemical models has altogether six connector arms 31a to 31f which radiate out from central parts 102, 103. The free ends of the connector arms are disposed in the corners of an imaginary regular hexahedron. The central parts 102 and 103 consist of two pivot parts 102 and 103 connected to each other by a stub axle 104. Three of the connector arms, namely 31a, 31b, 31c, are disposed on the pivot part 102 while the other three connector arms, 31d, 31e and 31f are disposed on the second pivot part 103. In order that the first-mentioned group of three may be the more readily differentiated from the second-mentioned group of three connector arms, there are disposed (according to FIGS. 16 and 17) on the free ends of the connector arms 31d, 31e and 31f disposed on the free ends of the connector arms 31d, 31e and 31f disposed on the pivot part 103, spheres D, E and F. These spheres, which may depict substituents, are however removable. All free ends of the connector arms have identically constructed coupling devices 50 which may have one of the above-described forms of embodiment.

Figure 18:
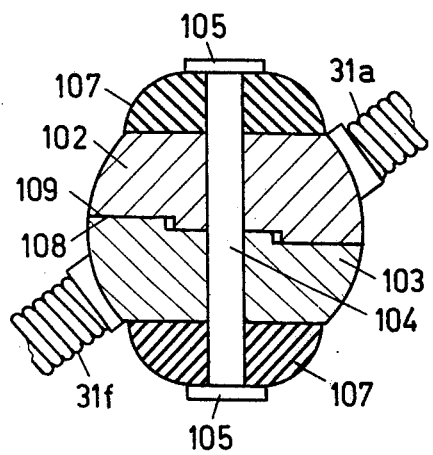
FIG. 18 shows on an enlarged scale a partial section on the line XVIII—XVIII in FIG. 17, through the middle part of the structural element.
Figure 19:
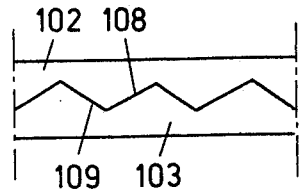
FIG. 19 diagrammatically illustrates a development of the peripheral face of the pivotal central parts of the structural element according to FIGS. 16 to 18.

According to FIG. 18, the stub axle 104 has end flanges 105. Between these flanges 105 and the pivot parts 102 and 103 there are inserted rubber-elastic spring elements 107 through which the stub axle 104 passes. Instead of the rubber-elastic spring elements 107, also coil thrust springs may be provided, similar to the illustration in FIG. 5. The spring elements 107 bias the two pivot parts 102 and 103 elastically against each other. The opposed surfaces of the pivot parts 102 and 103 are each provided with peripherally alternating depressions 108 and raised portions 109 (FIGS. 16, 18 and 19), which are so constructed and disposed that the raised portions 109 on one pivot part 102 can engage as notch elements into the depressions 108 on the other pivot part 103 which serve as notch recesses, and vice versa. Under the influence of the spring elements 107, the raised portions 109 and depressions 108 can held in engagement with one another, stabilising the angular positions of the pivot parts 102 and 103 with respect to each other. By overcoming a certain resistance, pivot parts 102 and 103 can however be rotated in respect to each other. According to the number of connector arms disposed on it, so each pivot part 102 and 103 has three raised portions 109 and three depressions 108. Thus, three notched positions of the pivot parts 102 and 103 result. In each of these notched positions, the connector arms disposed on one pivot part 102 are disposed between two connector arms of the other pivot part 103 and vice versa, as can be seen most clearly from FIG. 17. In the case of the embodiment illustrated, the two pivot parts 102 and 103 are constructed so that they are completely identical to each other and also the connector arms are disposed completely identically on these two pivot parts, which advantageously simplifies manufacture of the structural elements.

Figure 20:
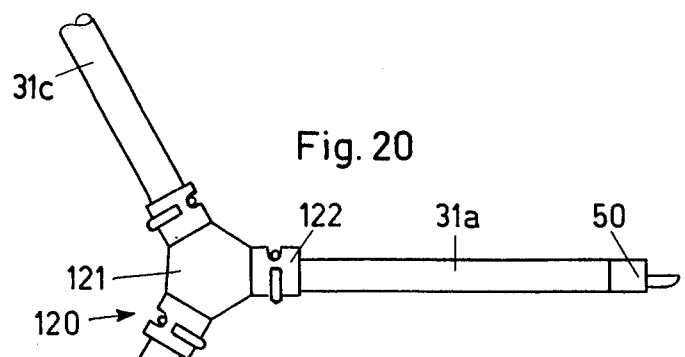
FIG. 20 shows a further example of embodiment of a structural element having three connector arms which are each disposed for rotation on a central part and about their longitudinal axis.
Figure 21:
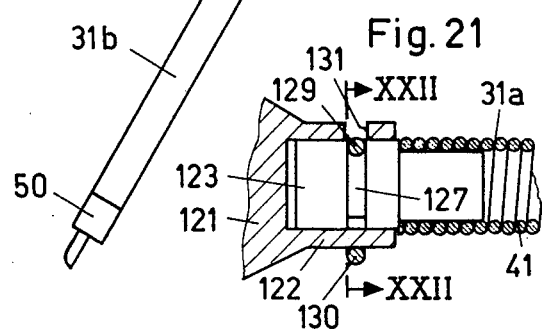
FIG. 21 shows on an enlarged scale a connecting point between the central part and one of the connector arms in section on the longitudinal axis of the relevant connector arm.
Figure 22:
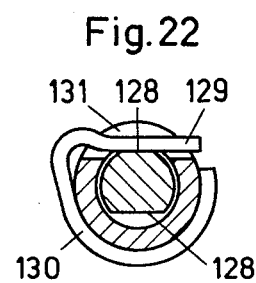
FIG. 22 is a cross-section on the line XXII—XXII in FIG. 20.

A further embodiment of a structural element 120 is shown in FIGS. 20, 21 and 22. This structural element has a central part 121 from which three connector arms 31a, 31b and 31c radiate outwardly. The connector arms themselves are identically constructed, as was described with reference to FIGS. 5, 7 and 8. The longitudinal axes of the connector arms can extend in a common plane, as shown in FIG. 20, or they may exhibit a three-dimensional configuration. On all three arms of the connector arms are identically constructed coupling devices 50. Each connector arm is connected to the central part 121 by a specially constructed articulating device as shown in greater detail in FIGS. 21 and 22. One pivot part is formed by a guide sleeve 123 rigidly disposed on the central part 121 and in which the pin-like other pivot part 123 is rotatably mounted. The pivot part 123 is rigidly connected to the relevant connector arm, e.g. 31a, and has a peripheral groove 128, on the bottom of which two oppositely disposed flattened portions 128 are constructed. A resilient arm 129 of a clip 130 made from spring-wire engages into the peripheral groove 127 in order to co-operate with the flattened portions 128 in the manner of a ratchet member. The wire clip 130 is laid around the guide sleeve 122 and the latter has a transversely extending slot 131 which allows the resilient arm 129 access to the peripheral groove 127 of the pivot part 123. By virtue of the clip 130 and particularly its arm 129, and in conjunction with the peripheral groove 127, the pivot part 123 is secured from slipping out of the guide sleeve 122. However, by means of the pivot part 123, the connector arm, e.g. 31a, is mounted on the central part 121 in such a way that it can rotate about its longitudinal axis, two preferred angular positions staggered by 180° with respect to each other being provided. These preferred angular positions arise due to engagement of the resilient arm 129 of the wire clip 130 into the flattened parts 128 of the peripheral groove 127 of the pivot part 123. The number of stop positions thus created will be chosen in conformity with the number of the other connector arms 31b, 31c.

When one connector arm, e.g. 31a, of the described structural element 120 is coupled to a connector arm of another identical or differently constructed structural element, the central part 121, together with the other connector arms 31b and 31c, can rotate through 180° with respect to the connector arm 31a and the other structural elements connected to it, the connector arms 31b and 31c changing their positions. Such an inversion alters the three-dimensional configuration of the stereochemical model formed by the structural elements. Angular positions other than the aforesaid stop positions are largely unstable.

Figure 23:
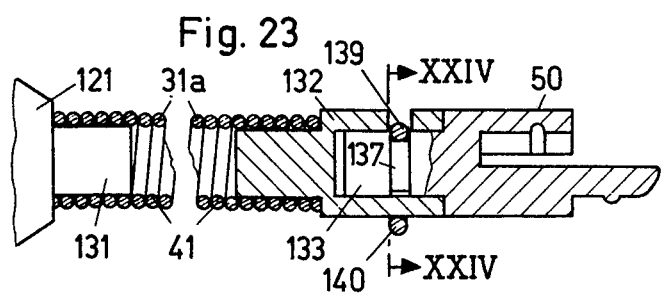
FIG. 23 shows a longitudinal section through a connector arm of an alternative embodiment of the structural element shown in FIG. 20.
Figure 24:
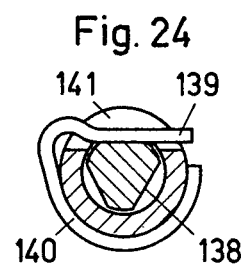
FIG. 24 is a cross-section on the line XXIV—XXIV in FIG. 23.

An alternative embodiment is illustrated in FIGS. 23 and 24. In contrast to the examples shown in FIGS. 20 to 22, one end of the coil spring 41 forming the relevant connector arm, e.g. 31a, is non-rotatably mounted on a pin 131 on the central part 121, e.g. by adhesion. Rigidly inserted into the opposite end of the coil spring 41 is a sleeve member 122 in which a pin-shaped extension 133 of the coupling device 50 is rotatably mounted. The sleeve member 132 and the pin-shaped extension 133 are thus pivot parts which can rotate with respect to each other. The extension 133 has a peripheral groove 137 on the bottom of which a number of flattened areas 138 (FIG. 24) are provided to form notch recesses. In the case of the embodiment illustrated, for example three such flattened areas 138 are provided, but it would also be possible to provide two, four or more, according to the number and disposition of the other connector arms fixed to the central part 121. Laid around the sleeve member 132 and made from spring wire is a clip 140 which has a spring arm 139 to engage through a slit 141 in the sleeve member 132 and co-operate with the peripheral groove 137 or the flattened area 138 thereof. The spring arm 139 acts as a stop member which, in conjunction with the flattened areas 138, provides preferred rotary positions for the clutch device 50 with respect to the connector arm.

Figure 25:
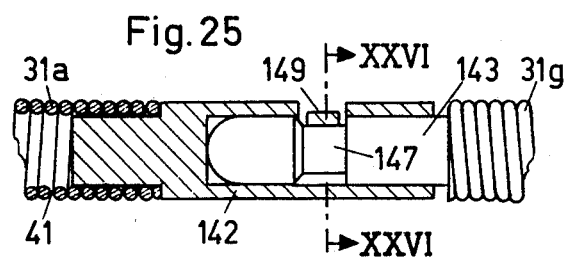
FIG. 25 shows a connector arm of a further alternative embodiment of the structural element shown in FIG. 20 in coupling engagement with a connector arm of a second structural element, partially in longitudinal section and partially in elevation.
Figure 26:
FIG. 26 is a cross-section on the line XXVI—XXVI in FIG. 25.

In the case of the example of embodiment shown in FIGS. 25 and 26, it is presupposed that the coil spring 41 forming the relevant connector arm, e.g. 31a, has one end non-rotatably connected to a central part. The other end of the coil spring 41 is likewise non-rotatably connected to a guide sleeve 142. This is at the same time a coupling device for coupling the relevant connector arm 31a to a connector arm 31g of a further structural element and is also constructed as a pivot part. A second pivot part 143 takes the form of a pin fitting into the guide sleeve and which is at the same time a coupling device for the connector arm 31g. The pin 143 has a peripheral groove 147 with flattened areas 148 (FIG. 26). The guide sleeve 142 has an inwardly deformed part 149 which, serving as a stop member, engages into the peripheral groove 147 and, in co-operation with the flattened area 148, provides rotary positions for the parts 142 and 143 with respect to each other. By notching engagement of the inwardly deformed part 149 into the peripheral groove 147, it is at the same time ensured that after the pin 143 has been inserted into the guide sleeve, an unintended separation of the coupling joint between the two connector arms 31a and 31g is prevented. When a certain resistance has been overcome, however, the pin 143 can be withdrawn from the guide sleeve again in order to separate from each other the connector arms which have been so far coupled.

Figure 27:
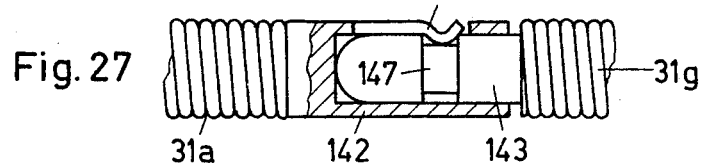
FIG. 27 finally illustrates a connector arm of another alternative embodiment of the structural element in coupling engagement with a connector arm of a second structural element, partially in longitudinal section and partially in elevation.

A slightly modified form of embodiment is shown in FIG. 27. It only differs from that shown in FIGS. 25 and 26 in that instead of the inwardly deformed part 149 of the guide sleeve 142, a spring tongue 159 is now constructed on the guide sleeve. Serving as a stop member, the tongue now co-operates with the flattened areas of the peripheral groove 147 of the spring 143. The tongue 159 may also be formed by a leaf-spring mounted on the guide sleeve 142.

A further embodiment of a structural element 160 for forming sterochemical models is shown in FIGS. 28 and 29. Three connector arms 31a, 31b and 31c are disposed to radiate out from central parts 162, 163 and have on their free ends identically constructed coupling devices 50. The central parts 162, 163 consists of two pivot parts 162 and 163 which are rotatably connected by means of a pin 164. One pivot part 163 is of substantially U-shaped construction and has two arms or cheeks between which the other pivot part 162 engages. One of the connector arms 31a is so disposed on the pivot part 162 that its longitudinal axis extends at right-angles to the axis 164. The other two connector arms 31b and 31c are disposed on the pivot part 163 so that they extend at identical angles with respect to the axis 142. By rotation of the pivot part 162 with respect to the other pivot part 163, the direction of the connector arm 31a can be varied. The pivot part 162 has two notch recesses 168 into which a ball 169, serving as a ratchet member, can engage under the influenece of a spring 167, the spring 167 and the ball 169 being disposed in a recess 170 in the pivot part 163, as shown in FIG. 29. Thus, the pivot part 162 has two notch positions. These are so chosen that the connector arm 31a, when in the engaged condition, assumes one or other of two preferred positions which are mirror-image of each other with respect to a plane comprising the longitudinal axes of the other two connector arms 31b and 31c.

I claim:

1. A structural element for forming stereochemical models of molecular bonds between mutivalent atoms, said structural element comprising:
   at least two connector arms representing the valences of at least one atom, at least two of said connector arms having each a free end portion provided with manually operable means for pairwise coaxial coupling and uncoupling of the arm to or from another connector arm of the same or of another said element;
   articulation means for pivotally connecting together at least two of the connector arms in such a manner as to permit variation of the angular relationship of at least one of the connector arms with respect to at least one other of the arms; biasing means associated with the articulation means for producing a discontinuous manually surmountable resistance against pivotal movement and therewith for providing at least two discrete and stable rest positions with predetermined angular relationships between the connector arms, depending on the natural behavior of the matter represented by structural element, thus avoiding unintended yet permitting intended movement from any selected rest position.

2. A structural element according to claim 1 wherein the articulation means comprises
   two parts which are pivoted in relation to one another, each said pivot part being mounted on one of said connector arms and at least one of said pivot parts having at least one notch and the other pivot part having a resilient member engageable with the notch of the first-mentioned pivot part, said notch and said resilient member forming parts of the biasing means.

3. A structural element according to claim 2, comprising
   a spring member biasing the pivot parts together in the direction of the pivot axis, said spring member further acting to assist the resilient member into engagement with a corresponding said notch.

4. A structural element according to claim 3 wherein the notch and resilient member are provided on surfaces of the pivot parts facing one another.

5. A structural element according to claim 4 wherein the articulation means comprises a stub axle having an abutment and the spring member is disposed on the outside of at least one said pivot part and is supported at one end on the corresponding pivot part and at the other end of the abutment of the stub axle.

6. A structural element according to claim 5 wherein one of the pivot parts has a recess and the spring member is at least partly concealed in said recess.

7. A structural element according to claim 3 comprising
   a stub axle coaxial with the pivot axis of the pivot parts and having,
   an abutment,
   the said stub axle being non-rotatably connected to one pivot part and passing through the other pivot part and that part of the stub axle which extends into the said other pivot part carries the said spring member abutting at one end the abutment of the stub axle, and comprising
   a slide member displaceable in the longitudinal direction of the stub axle but which is secured to the stub axle non-rotatably, the spring member abutting the slide member at the other end thereof and wherein a notch is provided externally on the said other pivotal part remote from the first-mentioned pivotal part and the slide member acts as a stop and is biased under the influenece of the spring member against the notched external surface of the said other pivotal part.

8. A structural element according to claim 7 wherein the stub axle is hollow and has a longitudinally-extending slot, the spring member being accommodated within the stub axle and the slide member taking the form of a transverse pin extending through said longitudinal slot.

9. A structural element according to claim 2 wherein each pivot part has at least one notch and at least one stop of resilient engagement with the notch of the othr pivot part, the two pivot parts being of identical form.

10. A structural element according to claim 3 wherein the longitudinal direction of at least one of the connector arms connected to the articulation means diverges from the articulation axis.

11. A structural element according to claim 2 wherein the longitudinal direction of at least one of the connector arms connected to the articulation means extends coaxially with the articulation axis.

12. A structural element according to claim 11 comprising a guide sleeve constituting one said pivot part and a pivot pin constituting the other said pivot part engaging in the guide sleeve, said pivot pin having at least one notch and having a non-circular cross-section and further comprising a stop member carried by the guide sleeve and cooperating with the notch of the pivot pin whereby to define said predetermined angluar relationship.

13. A structural element according to claim 12 wherein the stop member is formed by an inwardly-deformed part of the guide sleeve.

14. A structural element according to claim 12 comprising a spring tongue serving as a said stop member and mounted on the guide sleeve.

15. A structural element according to claim 12 comprising a clip mounted on the guide sleeve and having a resilient arm serving as said stop member which arm passes through an aperture in the guide sleeve to engage in said notch.

16. A structural element according to claim 2, wherein the pivot parts also act as coupling devices which can be separated from one another and which enable the separation and coupling of said at least two connector arms.

17. A structural element according to claim 1, wherein the means for pairwise coupling and uncoupling of the free end portions of connector arms comprise identically formed coupling devices at each free end of the connector arms such as to permit direct coupling of any two of all free ended coupling arms, the coupling arms each comprising a flexible element which is normally rectilinear when unloaded.

18. A structural element according to claim 17, wherein each said coupling device comprises a projecting part and a recess whereby coupling can be produced by engagement of the projecting part of one connector arm to the recess of the other arm and vice versa.

19. A structural element according to claim 18 wherein the projecting part comprises a plug pin and the recess comprises a socket and wherein both the pin and socket extend parallel to the longitudinal axis of the associated connector arm.

20. A structural element according to claim 19 wherein the cross-section of the plug pin is complementary to the cross-section of the plug socket.

21. A structural element according to claim 20 wherein the pin and the socket are of semi-circular cross-section.

22. A structural element according to claim 17 comprising a permanent magnet with North and South pole faces at its free end and constituting a part of the said coupling device whereby given connector arm can be coupled to the corresponding coupling device of another said connector arm.

23. A structural element according to claim 17 wherein the coupling device provides positive locking connection with a corresponding coupling device of another said connector arm.

24. A structural element according to claim 23 wherein each coupling device comprises at least one projection extending transversely with respect to the longitudinal axis of the associated connector arm and at least one notch whereby the projection can positively engage a notch of a similar coupling device and vice versa.

25. A structural element according to claim 24 wherein the projection and notch are formed on a locking element constructed as a bayonet connection.

26. A structural element according to claim 25 comprising a sleeve rotatable with respect to the associated connector arm and serving as said locking element.

27. A structural element according to claim 1 wherein at least one of the connector arms comprises a flexible element which is normally rectilinear when unloaded.

28. A structural element according to claim 27 wherein the flexible element is a helical spring with closely adjacent turns.

29. A structural element according to claim 1, wherein the pairwise coupling and uncoupling means are all identical coupling devices at the free end portions of the connector arms, each coupling device having a part complementary to and releasably engageable with a part on each other coupling device, said arms being normally straight but sufficiently resiliently deformable as to connect free end-to-free end with even the other connector arms of the same structural element, one end of each said connector arm being non-releasably connected to the articulation means of its structural element, such that a bond between atoms can be illustrated merely by effecting a single connection, namely between one coupling device on each of the structural elements representing said atoms.

* * * * *

UNITED STATES PATENT OFFICE
CERTIFICATE OF CORRECTION

Patent No. 4,030,209      Dated June 21, 1977

Inventor(s) André Dreiding

It is certified that error appears in the above-identified patent and that said Letters Patent are hereby corrected as shown below:

Column 14, line 44, "of", first occurrence, should read -- for --

Column 14, line 44, "othr" should read -- other --.

Column 16, line 20, "1" should read -- 29 --.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*